United States Patent [19]
Mrazek

[11] Patent Number: 4,787,660
[45] Date of Patent: Nov. 29, 1988

[54] ROPE PULLER

[76] Inventor: Karl F. Mrazek, 4 Botes Road, Albemarle, Germiston, Transvaal Province, South Africa

[21] Appl. No.: 98,312

[22] Filed: Sep. 18, 1987

[30] Foreign Application Priority Data

Sep. 19, 1986 [ZA] South Africa .................... 86/7135

[51] Int. Cl.$^4$ .............................................. F16G 11/04
[52] U.S. Cl. ..................... 294/1.1; 24/115 R; 24/130; 116/DIG. 1
[58] Field of Search ............... 294/1.1, 137, 153, 156, 294/171; 16/110 R, 114 R, 114 B; 24/115 R, 115 J, 115 M, 129 R, 129 A, 129 B, 129 D, 130, 132 R, 134 R, 136 R; 104/202, 222, 225; 114/218, 221 R; 116/137 R, DIG. 1, 44; 182/5, 133; 188/65.1, 65.4; 446/204

[56] References Cited

U.S. PATENT DOCUMENTS

| | | | |
|---|---|---|---|
| 675,788 | 6/1901 | Oakley | 188/65.1 |
| 678,246 | 7/1901 | Hansel | 188/65.1 X |
| 679,930 | 8/1901 | Webster | 24/130 |
| 831,038 | 9/1906 | Clendenon | 24/130 |
| 1,254,570 | 1/1918 | Bosworth | 24/115 J |
| 2,161,461 | 6/1939 | Doherty | 188/65.1 |
| 2,617,363 | 11/1952 | Anketell | 294/137 X |
| 3,574,900 | 4/1971 | Emery | 24/130 |
| 3,744,098 | 7/1973 | Bowers | 294/1.1 X |
| 3,800,361 | 4/1974 | Stauffer | 16/114 B X |
| 4,120,077 | 10/1978 | Fink | 24/130 |
| 4,194,714 | 3/1980 | Schultz | 116/DIG. 1 |
| 4,217,847 | 8/1980 | McCloud | 114/218 |
| 4,302,869 | 12/1981 | Hackney | 294/1.1 X |
| 4,361,938 | 12/1982 | Emery | 24/130 |
| 4,590,640 | 5/1986 | Enersen | 294/171 X |

FOREIGN PATENT DOCUMENTS 652441 2/1963 Italy ................................. 188/65.1

OTHER PUBLICATIONS

Gersak Gebrauchsmuster—Published Nov. 13, 1986.

Primary Examiner—Johnny D. Cherry
Attorney, Agent, or Firm—Banner, Birch, McKie & Beckett

[57] ABSTRACT

A device for use in pulling ropes is in the form of an elongated handle having a passage extending between one end and the side thereof. A cleat located in the passage is adapted to grip a rope in the passage and to support a tensional force in a rope emerging from the passage at the side of the handle.

5 Claims, 1 Drawing Sheet

ROPE PULLER

INTRODUCTION TO THE INVENTION

THIS INVENTION relates to hand held device for manually exerting a tensile force on ropes.

In this specification the term 'rope' includes any flexible member of reasonable thickness and adapted to carry a tensile load..

BACKGROUND TO THE INVENTION

It is often necessary to hold a rope and pull it hard in order to place a tensile loading on the rope. Sailing for example, requires ropes such as sheets, halyards and the like to be pulled in order to properly set a sail, raise a sail or like operations. Pulling on a rope in this manner can hurt the hands of the person pulling on the rope.

One simple rope puller known to the Applicant is described in U.S. Pat. Specification No. 4,302,869. However, it is considered that this rope puller is too cumbersome and the rope is not easily introduced into the cleat of the rope puller. A similar problem is associated with the rope puller described in U.S. Pat. No. 3,744,098.

It is an object of this invention to provide a device for hand gripping a rope which is easy to engage with and disengage from a rope.

According to the invention a device for use in manually exerting a tensile force in a rope comprises an elongated handle adapted to fit in the palm of a user's hand, a passage for a rope extending through the handle from one end of the handle to the side of the handle at a position removed from the said end, the passage being open to the exterior of the handle along the whole of its length and including rope gripping means in its length.

Further according to the invention the passage is generally 'L' shaped and is in the form of a recess in the handle.

Still further according to the invention the operation of the gripping means is uni-directional and adapted to grip a rope emerging from the passage at the side of the handle.

Still further according to the invention the rope gripping means is a cleat the cleat having at least one 'V' shaped formation for engaging a rope.

Still further according to the invention the handle includes finger grip formations on the side thereof corresponding to the end of the passage.

Still further according to the invention the handle includes an aperture therethrough.

Still further according to the invention the handle may include a whistle.

Still further according to the invention the handle may include a shackle key.

BRIEF DESCRIPTION OF THE DRAWINGS

An embodiment of the invention described by way of example only, follows with reference to the accompanying drawings in which.

DETAILED DESCRIPTION OF THE DRAWINGS

Figure 1:
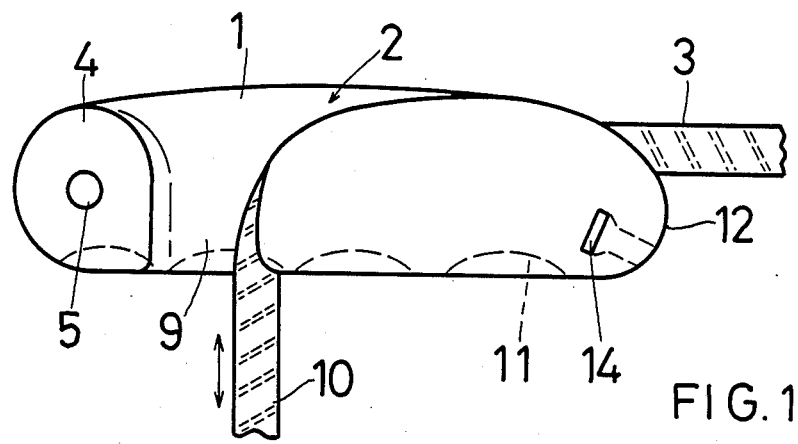
FIG. 1 shows a side view of a device for pulling a rope.
Figure 2:
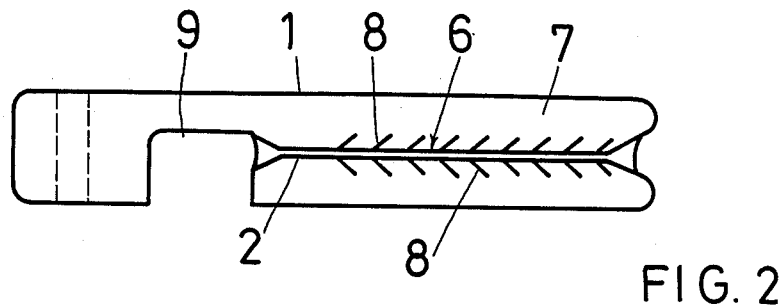
FIG. 2 shows a plan view of the puller of FIG. 1.

As shown in the illustrations, a device for pulling a rope comprises a body 1 having a rope passage 2 defined therein in which a rope 3 may be received as shown. The body has a bulbous forward end 4 which increases the dimension of the body in the forward region thereof and enables the body to be better gripped in use. The bulbous end has a hole 5 therethrough for receiving a tie cord therein.

Figure 3:
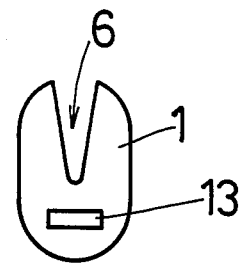
FIG. 3 shows an end view thereof.

A cleat 6 is formed in the rearward part of the rope puller, the cleat 6 being defined by a pair of fixed jaws 7 providing 'V' shaped rope gripping formations S thereon as is best seen in FIG. 3. The rope gripping formations 8 are thus angled relative to the length of the rope puller such that the lowermost ends thereof are forward of the uppermost ends thereof. This configuration of formations will tend to pull the rope 3 located in the cleat down towards the base of the 'V' shape, thereby improving the grip on the rope as the rope puller is used to pull on a rope.

The rope passage is defined by a recess 9 on one side of the body and the area between the jaws 7. Thus, the rope passage is substantially 'L' shaped and has a substantially right angled configuration. The tension side 10 of the rope passing through the rope puller will pass between two fingers of a person holding the rope puller in his hand. From the aforegoing it will be appreciated that it will be easy to introduce a rope into, and remove it from, the puller.

Many variations to the abovedescribed embodiment may be made without departing from the scope of the invention. For example, it will be possible to form indentations in the lower side of the rope puller as shown at numeral 11 for improving the grip of a person holding the rope puller. An advantage of the puller as described is that an improved grip is placed on the rope passing through the puller as the tension on the rope is increased. However, in order to remove the rope from the puller the tension side 10 of the rope will simply be pulled out of recess 9 and rearwardly out of the cleat 6. For this reason the cleat 6 as described is the preferred form.

In the end 12 of the handle opposite the hole 5 is a shackle key 13 in the form of a rectangular slot. This slot communicates directly with a whistle 14 which emerges from the side of the handle in the form of a slot.

It will be appreciated that many different forms of cleats are possible which can be hand held and allow a rope to be easily introduced therein or removed therefrom in use. It is specifically envisaged that movable jaw cleats may be used. Clearly, the rope puller may be made from many suitable materials and plastics and light metal materials are specifically envisaged.

What I claim as new and desire to secure by Letters Patent is:

1. A device for use in manually exerting a tensile force on a rope comprising an elongated handle having a forward and a rearward end adapted to fit in the palm of a user's hand;

a passage for a rope extending from the rearward end of the handle to a side of the handle at a position between the ends thereof, the passage being open to the exterior of the handle along its entire length; and a rope gripping cleat located in the passage with the direction of operation of the cleat being to restrain a rope in the passage when tension is applied to the portion of the rope emerging from the side of the handle.

2. A device as claimed in claim 1 in which the passage is generally 'L' shaped.

3. A device as claimed in claim 1 in which the passage is in the form of a recess in the handle.

4. A device as claimed in claim 1 in which the cleat has at least one 'V' shaped formation for engaging a rope.

5. A device as claimed in claim 1 in which the handle includes finger grip formations on at least the side thereof including the rope passage.

* * * * *